United States Patent
Chitnis et al.

(10) Patent No.: US 10,076,089 B2
(45) Date of Patent: Sep. 18, 2018

(54) METHOD OF CONTROLLING SOIL MOISTURE, WATER ACCUMULATION AND FERTILIZER DISTRIBUTION IN LAND

(71) Applicant: INTERNATIONAL BUSINESS MACHINES CORPORATION, Armonk, NY (US)

(72) Inventors: Upendra D. Chitnis, Danbury, CT (US); Levente Klein, Tuckahoe, NY (US); Fernando J. Marianno, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 15/067,451

(22) Filed: Mar. 11, 2016

(65) Prior Publication Data

US 2017/0258020 A1 Sep. 14, 2017

(51) Int. Cl.
| | | |
|---|---|---|
| *A01G 25/16* | (2006.01) | |
| *E03F 1/00* | (2006.01) | |
| *E02B 11/00* | (2006.01) | |
| *G06Q 10/06* | (2012.01) | |
| *G06Q 50/02* | (2012.01) | |

(Continued)

(52) U.S. Cl.
CPC .......... *A01G 25/167* (2013.01); *E02B 11/005* (2013.01); *E03F 1/00* (2013.01); *G05B 19/042* (2013.01); *G06F 17/30241* (2013.01); *G06F 17/30268* (2013.01); *G06Q 10/0635* (2013.01); *G06Q 50/02* (2013.01); *G05B 2219/2625* (2013.01)

(58) Field of Classification Search
CPC combination set(s) only.
See application file for complete search history.

(56) References Cited

U.S. PATENT DOCUMENTS

| | | |
|---|---|---|
| 4,621,945 A | 11/1986 | Schafer et al. |
| 5,944,444 A | 8/1999 | Motz et al. |

(Continued)

OTHER PUBLICATIONS

C.F. Drury et al., Managing Tile Drainage, Subirrigation, and Nitrogen Fertilization to Enhance Crop Yields and Reduce Nitrate Loss, J. Environ. Qual. 38:1193-1204, Apr. 27, 2009.

(Continued)

*Primary Examiner* — Mamadou Diallo
(74) *Attorney, Agent, or Firm* — Tutunjian & Bitetto, P.C.; Vazken Alexanian

(57) ABSTRACT

Described herein is a method of controlling soil moisture, water accumulation and fertilizer distribution in land. Elevation location data for land areas are extracted from two or more pixels of a topographic image including topographic data. Each pixel represents a land area. Wetness indices for the land areas are determined from the elevation and location data, based on the slope between two or more defined areas of land and an upslope contributing area per unit contour length. At risk defined areas of land, e.g., those at risk of accumulating water are identified based on wetness indices. Water is transported from the at risk defined areas of land to another location. The transporting of water reduces the risk of accumulating water in the at risk defined areas of land and improves crop growth potential in those areas.

20 Claims, 12 Drawing Sheets

(51) Int. Cl.
     *G06F 17/30*      (2006.01)
     *G05B 19/042*      (2006.01)

(56) References Cited

U.S. PATENT DOCUMENTS

| | | | |
|---|---|---|---|
| 6,715,508 B2 | 4/2004 | Schafer et al. | |
| 7,857,546 B2 | 12/2010 | Furrer et al. | |
| 7,942,606 B2 | 5/2011 | Schafer | |
| 8,751,052 B1 | 6/2014 | Campbell et al. | |
| 2007/0208510 A1 | 9/2007 | Anderson et al. | |
| 2012/0126026 A1* | 5/2012 | Sparks | A01G 25/167 239/64 |
| 2015/0201570 A1* | 7/2015 | Lin | A01G 25/167 137/1 |
| 2016/0183484 A1* | 6/2016 | Richings, Sr. | A01G 25/167 239/11 |
| 2016/0255763 A1* | 9/2016 | Canyon | A01B 79/005 |
| 2017/0332566 A1* | 11/2017 | Emory | A01G 25/167 |

OTHER PUBLICATIONS

C.H. Green et al., Hydrologic Evaluation of the Soil and Water Assessment Tool for a Large Tile-Drained Watershed in Iowa, American Society of Agricultural and Biological Engineers, Mar.-Apr. 2006, v. 49, No. 2, pp. 413-422.

Tang et al., The Influence of Precipitation Variability and Partial Irrigation within Grid Cells on a Hydrological Simulation, Journal of Hydrometeorology, vol. 8, pp. 499-512, Jun. 2007.

\* cited by examiner

METHOD OF CONTROLLING SOIL MOISTURE, WATER ACCUMULATION AND FERTILIZER DISTRIBUTION IN LAND

BACKGROUND

Technical Field

The present invention relates to a method of controlling soil moisture, water accumulation and fertilizer distribution in land. In particular, the present method employs topographic data to implement the control on farmland, where elevational differences may redistribute water and fertilizer.

Description of the Related Art

The topography of the land, the amount of water that falls on the land (e.g. through precipitation and irrigation), and soil properties factor into the amount of moisture that accumulate in the soil within a given land portion. Such considerations matter to the farmer and others involved in farm management. The orientation of farmland with regard to the position of the sun influences the amount of water removed from the soil by evaporation, which is another component of soil moisture variations across the land. The amount of water retained by the soil may be related to achievable crop yield, whereas lack of water or excess water can reduce the yield. Year-to-year variations in the yield can be attributed to the amount of water retained by the soil and other factors like farm management, seed type, among other factors.

Within a farm or other parcel of land, there may be any number of variations in the elevation of the land. Water will accumulate in areas of low elevation, with precipitation and water from irrigation running off from higher elevation areas within a farm. Low lying areas may be expected to have more water on and in the soil, due to water collecting in these areas. Depending on the amount of water and evaporation from solar radiation, crop yield may be affected adversely. Too much water accumulating on or in the land may adversely affect crop yield. For example, in a relatively wet year more water will accumulate in low elevation areas, with the excess water possibly pooling on the surface. Such excessive water can lower crop yield.

In agriculture, too much water can be counterproductive by preventing root development, thereby inhibiting the growth of crops. Too much water also can limit access to the land, particularly by farm machinery. Large and heavy farm machinery, e.g., tractors and other implements, are used to prepare the seedbed, to plant the crop, to cultivate the crop, and to harvest the crop. Operating heavy machinery on excessively wet soil may compact the soil to an extent that the soil becomes degraded and unusable for growing purposes.

SUMMARY

According to an embodiment of the present principles, described herein is a computer-implemented method of controlling soil moisture and water accumulation in land. In the method, elevation data and location data for defined areas of land within a larger area of land are extracted from two or more pixels of a topographic image that includes topographic data, with each pixel corresponding to a defined area of land. The elevation and location data are employed in determining wetness indices for the defined areas of land based on a slope between two or more defined areas of land and an upslope contributing area per unit contour length for the defined areas of land. Based on the determined wetness indices, at risk defined areas of land that are at risk of accumulating water are identified. Water is transported from the at risk defined areas of land to another location. The determination of wetness indices is made in a hardware processer and the transporting of water reduces the risk of accumulating water in the at risk defined areas of land and improves crop growth potential in said areas.

Further in accordance with present principles, described is a system for controlling soil moisture and water accumulation in land. The system includes one or more processors including memory and one or more inputs through which topographic data for land is received by the system. The system includes an analyzer that analyzes the topographic data to determine the elevations and locations of defined areas of the land and a wetness index calculator that determines wetness indices for the defined areas of the land. A risk determiner and risk alleviator is provided that, based on the determined wetness indices, identifies at risk defined areas of land that are at risk of accumulating water and controls the transporting of water away from the at risk defined areas of land. A network of passages is provided to transport water away from the at risk defined areas of land.

Still further in accordance with present principles, described is computer program product for controlling soil moisture and water accumulation in land, the computer program product comprising a non-transitory computer readable storage medium having program instructions embodied therewith, the program instructions being executable by a computer to cause the computer to perform a method in which elevation data and location data for defined areas of land within a larger area of land are extracted from two or more pixels of a topographic image that includes topographic data, with each pixel corresponding to a defined area of land. The elevation and location data are employed in determining wetness indices for the defined areas of land based on a slope between two or more defined areas of land and an upslope contributing area per unit contour length for the defined areas of land. Based on the determined wetness indices, at risk defined areas of land that are at risk of accumulating water are identified. Water is transported from the at risk defined areas of land to another location. The determination of wetness indices reduces the risk of accumulating water in the at risk defined areas of land and improves crop growth potential in said areas.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
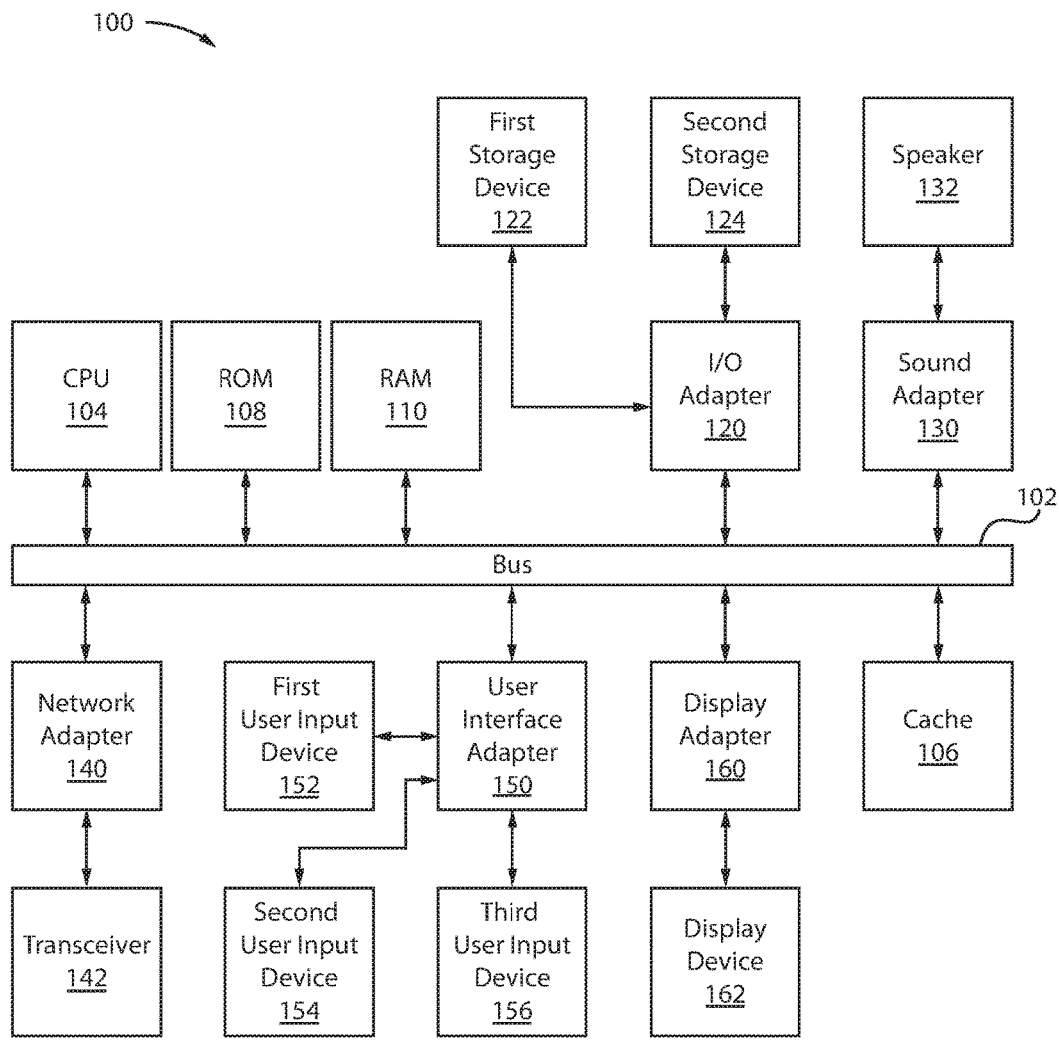
FIG. 1 shows an exemplary embodiment of a processing system to which the present principles may be applied.

According to an embodiment of the present principles, described is a method in which topology of a plot of land is analyzed and determinations are made concerning the likelihood that water will accumulate on the surface of certain parts of the land and/or whether certain parts are likely to accumulation more water than would be beneficial. Topographic data for a plot of land is obtained. The topographic data may be an image in which the pixels of the image correspond to cells, e.g., discreet portions of land areas that have a size, e.g., an area, that is dependent on the resolution of the image. The slope between two or more adjacent areas of land is determined. Then, a wetness index is determined for the areas of land. If it is determined that, based on the wetness indices, that areas of land are at risk of accumulating water, then action is then taken. For example, a tiling system having a network of interconnected pipes and control valves configured to move water away from high risk areas of land may be installed and used to transport water to a water source location, e.g., a lake, a pond, a stream a river, etc.

In one embodiment, the pipes of the tiling system may be installed at a subsurface depth that is dependent upon the topography and the wetness index. In one embodiment, the subsurface depth may be proportional to the wetness index, e.g., the higher the wetness index, the deeper the network of passages configured to remove water, e.g., the pipes of the tiling system, may be installed below the surface, making it more likely that a greater portion of the water will be captured by the pipes.

In yet another embodiment, the pipes of the tiling system can be installed in greater quantities and densities in portions of the land having high wetness indices than in land portions with low wetness indices. In yet another embodiment, the network of passages configured to remove water include trenches formed in the land that connect high wetness index land portions with water source locations such as lakes, ponds, streams, and other water sources where water may be discharged. In one embodiment, the location of the network of passages configured to remove water can be determined based on the shortest possible path from the high wetness index land portions to the water source.

In still another embodiment, a piping system can be installed with operative features that allow for the removal of relatively more water from areas of land having high wetness indices. For example, the pipes of the piping system may have holes to allow water in the soil environment to flow into the interior of the pipe and be transported away to a water source location. The pipes may be provided with valves that would control the amount of water that can flow into the pipes. In one embodiment, the valves may be operable to control the amount of water that flows into the pipes and the amount of water that remains in the soil at a given time. In one other embodiment, the valves are electromechanically operated, e.g., a solenoid valve in which the valve is controlled by an electric current flowing through a solenoid. In one embodiment, the operable valves, e.g., the solenoid valves, are operated by a controlling system.

In another embodiment according to the present principles, the wetness index determinations may be used to manage, control and redistribute the amount of fertilizer applied to the land. For example, fertilizer may be applied to the land, e.g., to all of the fields where crops have been planted. From the topographic data, the quantity of water that may run off from an elevated area of land or areas of land to low lying areas of land of lower elevation where water may accumulate can be determined. In one embodiment, the solubility data for the fertilizer, e.g., the amount of fertilizer that dissolves in a unit of water at a given temperature, e.g., weight/volume, and in some instances, the time it takes for the dissolving to take place, e.g., weight/volume per unit of time, can be used to estimate how much fertilizer is transferred by water flowing from a relatively low wetness index area of land where there is water runoff to a relatively high wet wetness index area of land where the water collects. By transporting fertilizer-containing water from the low lying land areas to e.g., other land areas where there may be runoff, the amount of fertilizer used can be controlled and managed.

In yet another embodiment, nitrogen sensors that sense the amount of fertilizer used to enhance the crop yield may be installed in order to collect and transmit data on the nitrogen content in the soil of individual land area. The nitrogen content data collected by the nitrogen sensors can be analyzed to determine the amount of nitrogen being dissolved into the water which is being carried off to land areas of high wetness indices, which may be low lying land areas. The network of passages configured to remove water, e.g., the pipe system, can be operated by controlling operable valves, allowing water to be transported away and possibly redistributed to higher elevation, low wetness index land areas. Further, the nitrogen content data collected by the nitrogen sensors can be analyzed to determine where additional fertilizer should be applied to the soil of one or more land areas.

Referring now to the drawings in which like numerals represent the same or similar elements and initially to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
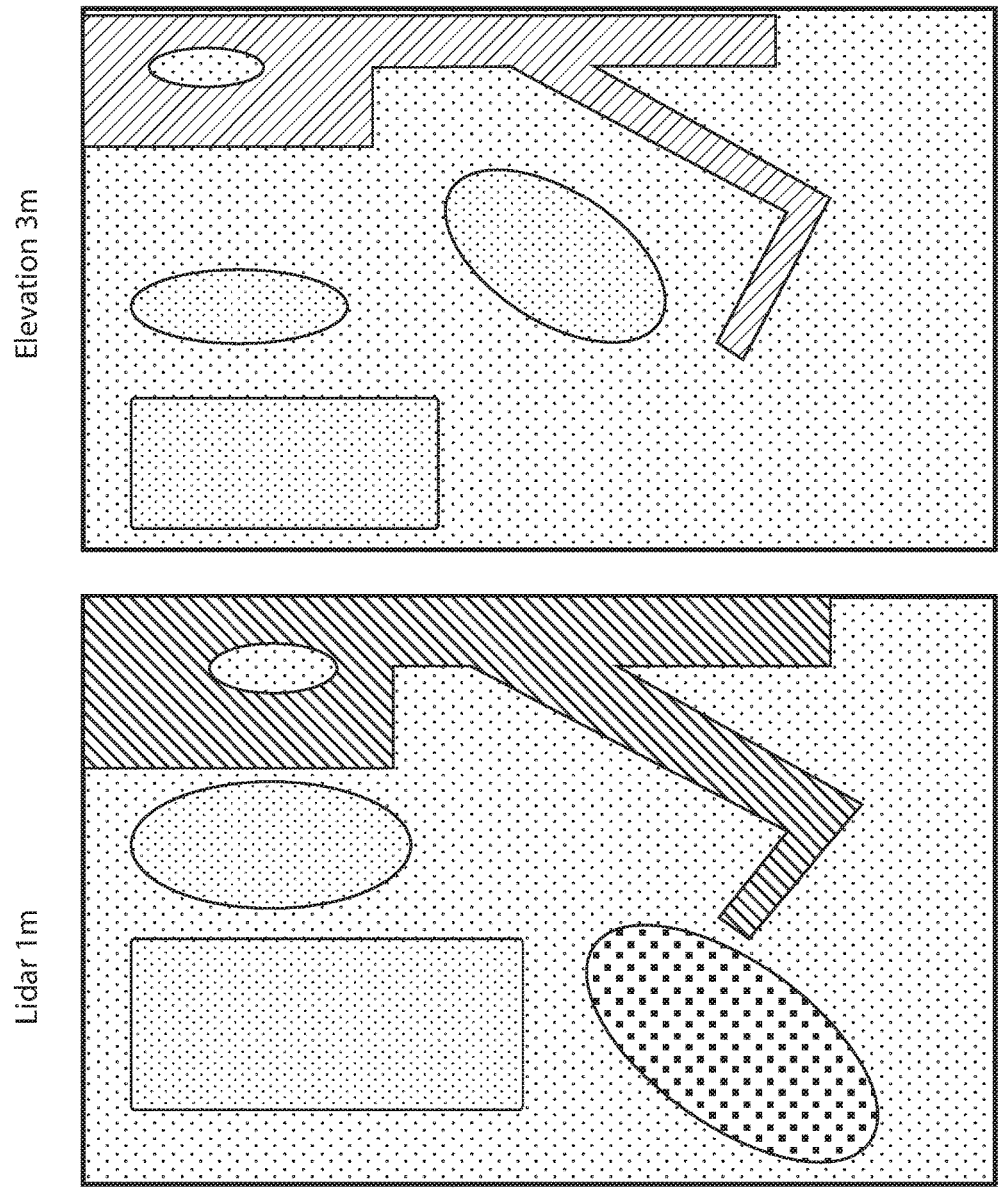
FIG. 2 represents topographic images that may be used in making determinations of wetness indices for different portions, e.g., areas of land, in accordance with an embodiment of the with present principles.

FIG. 2 is a drawing that represents topographic images that include data which can be analyzed in accordance with embodiments of the present principles. The drawing shows a plot of land at resolutions of 1 meter and 3 meters, e.g., 1 m and 3 m. At 1 m, the resolution is sufficient to provide detail for about a 1 m×1 m area of land. At 3 m, the resolution is sufficient to provide detail for about a 3 m×3 m area of land. The 1 m portion of the drawing represents an image that may obtained from a Lidar system, and the 3 m portion of the drawing represents an image that may be obtained from the elevation data derived from another kind of topographical survey, e.g., such as one available from the National Elevation Dataset (NED) created by the United States Geological Survey. Images may be available at other resolutions, e.g., 10 m, representing a 10 m by 10 m area of land. A 1 m resolution Lidar image may provide the sharpest resolution of the details of the land and the most accurate and reliable elevation information. Such images may best show the areas where water is accumulating or where it is running off.

The image data shows regions of different shadings. The lightly-shaded regions represent higher elevation areas where water runs off to low lying areas. The black-shaded regions and the darker shaded regions represent low lying areas where water accumulates, e.g., the water accumulates as run off from higher elevation areas. The depiction of the 1 m Lidar image is shown as having a sharper resolution than the depiction of the 3 m elevation image.

The images of the kind represented in the drawing are comprised of pixels. In one embodiment, each pixel of the images correlates with the image resolution. For example, the pixels of an image having a resolution of 1 m may correspond to areas that are 1 m by 1 m in size; the pixels of an image having a resolution of 3 m may correspond to areas that are 3 m by 3 m in size; and the pixels of an image having a resolution of 10 m may correspond to areas that are 10 m by 10 m in size. Each pixel of the image stores topography data for the land area represented by the pixel, and stores the location of the land area corresponding the pixel. The stored topography data may include the elevation of the land area of the pixel, e.g., the elevation above sea level expressed as a unit of distance, such as feet or meters. By extracting this information from the topography data, determinations can be made, e.g., determinations such as the slope between adjacent or nearby land areas and the upslope contributing area, as discussed below.

The water run off areas generally correspond to higher ground and the water accumulation areas correspond to lower ground. In the absence of a barrier or diversionary system, water may fill up in the water accumulation areas, depositing too much water in these places. Whether water accumulates and how much water accumulates may be based on the kind of soil and the soil characteristics. For example water may be more readily absorbed by a high porosity soil and may be more likely to collect on the surface, e.g., not be absorbed into the soil, if the soil has a high clay content. Collected water may remain on the surface for a relatively long period of time, depending upon soil absorption rates and the amount of water that runs off of relatively higher areas and collects in lower areas.

Figure 3:
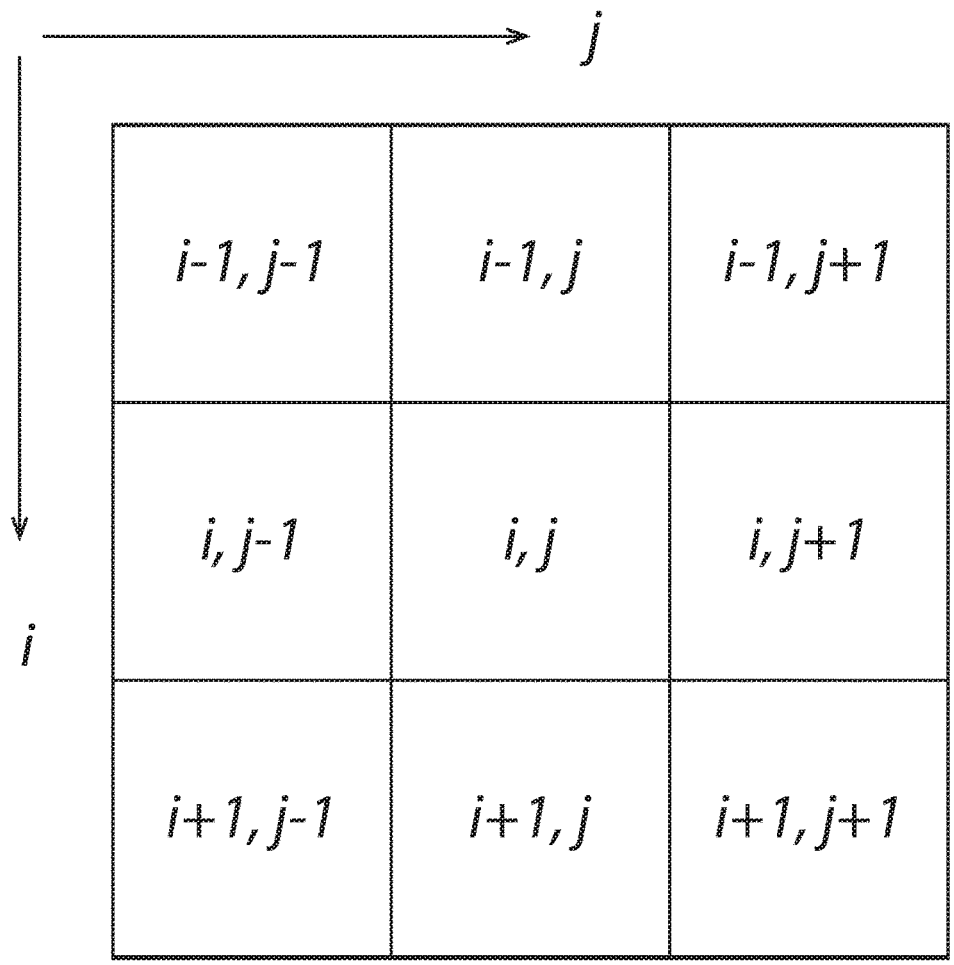
FIG. 3 depicts additional topographical data that may be used in making determinations of wetness indices for different portions of land areas in accordance with an embodiment of the with present principles.

FIG. 3 depicts a representative manner in which the wetness index ($W_i$) of the areas of land of a plot of land can be determined from the data available from a topographic image of the land. The grid arrangement shown the figure corresponds to the pixels of an image, which as indicated above represent a discreet land areas having a size related to the resolution of the image. The figure is intended to be exemplary of the pixels and the areas of land captured by the pixels. Nine (9) discreet areas, e.g., squares, in a 3 by 3 configuration is shown in the figure. It should be understood that for a farm that may be hundreds or thousands of acres in size, there may be an extremely large number of pixels that correspond to the entire farm.

Each of the nine (9) pixels is uniquely defined by its location that is defined by a coordinate system based on two axes i, j. The central square (e.g., pixel) is identified as i,j, and, the other eight squares are identified relative to square i,j in a coordinate naming system that is self-explained in FIG. 3. This identification system is one of many different identification systems that can be used. For example, in the alternative each discreet area could be assigned a numeric identifier, an identifier that is an alphabet letter, or an alphanumeric identifier.

The pixels corresponding to discreet land areas of the plot of land contain information on the elevation of that discreet land area. From this information, the local slope between two or more adjacent pixels, e.g., discreet land areas, can be determined. When the local slope is determined, the wetness index ($W_i$) and the slope $\beta$ between two or more adjacent areas of land can be determined for the pixels, e.g., discreet land areas.

In an example taken from FIG. 3, the slope β for the pixels identified as (i, j+1) and (i, j−1) may be determined as follows:

$$\beta = \frac{dz}{dx} = [elev(i, j+1) - elev(i, j-1)]/\text{length}(i, j+1) + \text{length}(i, j-1)$$

Where elev(i, j+1) and elev(i, j−1) are the elevations of the land areas corresponding to the pixels (i, j+1) and (i, j−1) respectively, expressed as a unit of length (e.g., meters, feet) and length (i, j+1) and length (i, j−1) are the lengths of discreet land areas represented by the pixels (i, j+1) and (i, j−1) respectively.

The wetness index ($W_i$) is defined as ln(α/tan(β)), where α is the upslope contributing area per unit contour length and β is the slope determined in the manner described above. The upslope contributing area is the number of pixels, e.g., areas of land, that share a continuous slope, e.g., a slope extending continuously in a given direction such that the accumulated flow (and therefore area) passed down from upslope neighbors (e.g., land areas) ends up in a given land area. The direction(s) in which the water flows can be tracked from any given land area to one or more other areas of land based in the relative elevations of the neighboring pixels. The number of areas of land from which the water of one given land area flows to or through can be identified. Likewise, the number of areas of land that contribute to the water collecting on a given land area, in terms of the water originally falling on a land area, or water flowing through a land area or areas of land on the way to the given land area where water is collecting can be counted and identified.

From this information, wetness indices can be determined for each pixel, e.g., land area in the plot of land. From this information, it can be determined which of the areas have low wetness indices and thus are likely to pass water to other areas through run off, and which of the areas have high wetness indices are likely to receive water from other areas.

Figure 4:
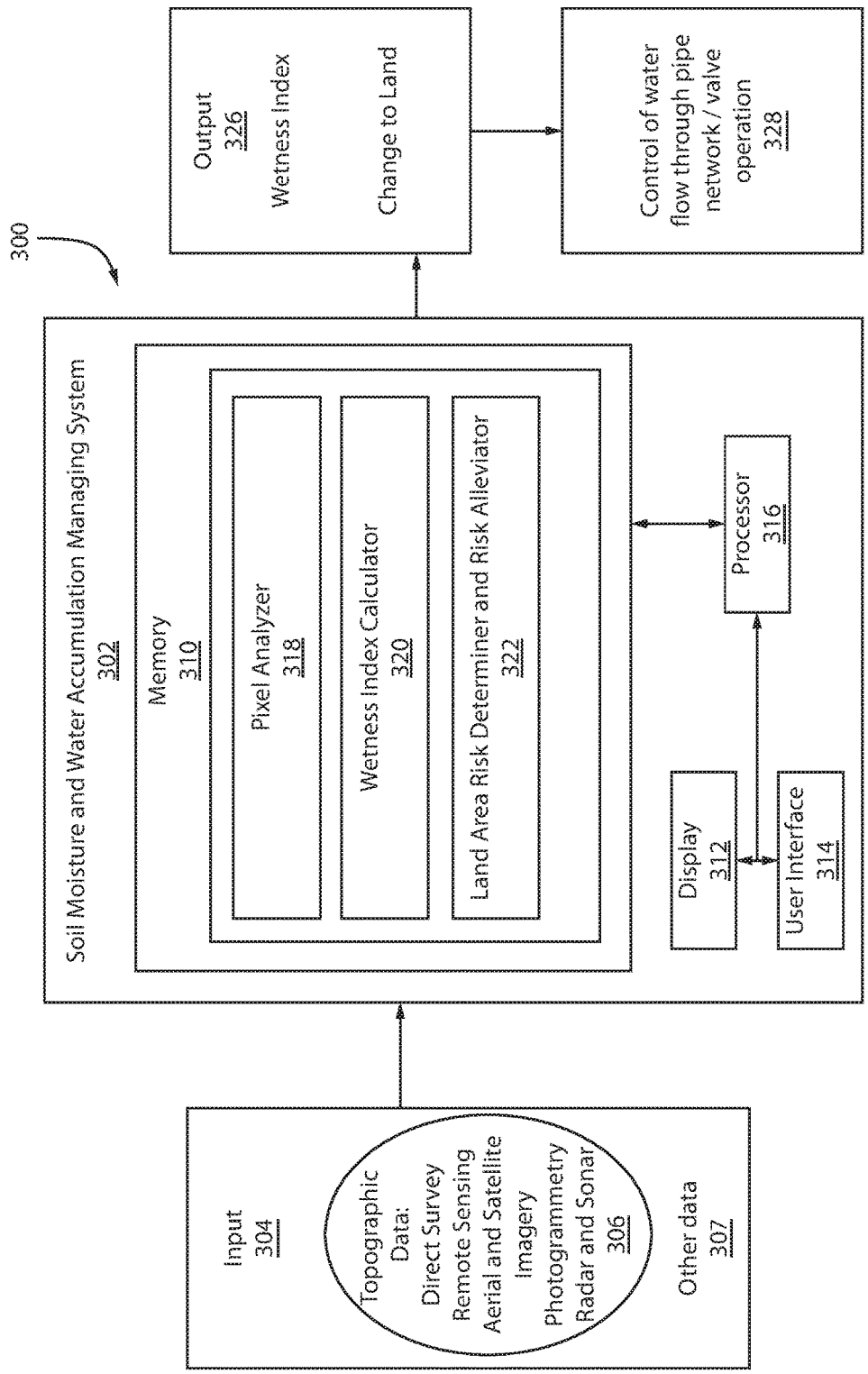
FIG. 4 depicts an exemplary embodiment of a system for controlling soil moisture and water accumulation in accordance with an embodiment of the present principles.

Referring now to FIG. 4, a system 300 in accordance with an embodiment of the present principles is shown with respect to an operational environment in which it can be utilized. System 300 includes a soil moisture and water accumulation managing system 302 that includes one or more processors 316 and memory 310 for storing applications, modules and other data. In one embodiment, the memory unit 310 includes a large number of memory blocks e.g., where calculations and data analysis may be performed. The system 300 may also include one or more displays 312 for viewing content. The display 312 may permit a user to interact with the system and its components and functions. This may be facilitated by the inclusion of a user interface 314, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 300 is depicted as a computer-implemented system for managing and controlling soil moisture and water accumulation in accordance with an embodiment of the present principles, thereby managing land, e.g., farmland, in a manner that maximizes crop yields. By managing the conditions under which water is distributed due to topographical considerations, those involved in farm management can maximize crop yields, thereby meeting and perhaps exceeding crop yield projections.

System 300 receives input 304, which may be topographical data, e.g., maps and images. For example, such topographical maps and images may come from the National Elevation Database (NED) created by the U.S. Geological Service. The information may come from work performed by government or non-government agencies, individuals, and others who carry out Lidar imaging. In another embodiment, the topographic data may come from other sources, such as a direct survey of the land, remote sensing, other kinds of aerial and satellite imaging, photogrammetry, radar and sonar. Other data 307 may be input into the system, such as heat and temperature data that would provide a basis for determining the extent of water evaporation that may occur. Such data may be collected by sensors located on or in the land. Such sensors may wirelessly transmit the collected data to the system. Sensors may be located on or in the land for determining the amount of moisture in the soil, and/or the amount of water that collects on the surface of the land.

Wetness index determination system 302 includes pixel analyzer 318, wetness index calculator 320 and land area risk determiner/risk alleviator 322. The pixel analyzer 318 receives the input data, e.g., topographical image data from the NED and identifies the plot of land to be analyzed. The pixel analyzer 318 analyzes the topographical image data and extracts information on the elevations and locations of the areas of land within the larger area of land. From this information the pixel analyzer 318 determines the local slope between areas of land that correspond to the pixels. In one embodiment, the pixel analyzer 318 determines the local slope β through application of the formula:

$$\beta = \frac{dz}{dx} = [elev(pixel1) - elev(pixel2)]/\text{length}(pixel1) + \text{length}(pixel2)$$

Where elev(pixel1) and elev(pixel2) are the elevations of the land areas corresponding to the pixels 1 and 2 respectively, expressed as a unit of length (e.g., meters, feet) and length (pixel1) and length (pixel2) are the lengths of the areas of land represented by the pixels 1 and 2 respectively, where pixels 1 and 2 are areas of land, e.g., portions of land within the plot of land. In relation to FIG. 3 above, pixels 1 and 2 may be the aforementioned areas (i, j+1) and (i, j−1) respectively.

The wetness index calculator 320 makes a determination of the wetness index for each of the areas of land of the larger area of land. The wetness index calculator may first determine the upslope contributing area per unit contour length for each discreet area. The upslope contributing area is the number of pixels, e.g., land areas, that slope towards a given pixel area in which water flow accumulates, having been passed to the given pixel area from the neighboring upslope pixel areas. The direction(s) in which the water flows can be tracked from any given pixel area to one or more other pixel areas based in the relative elevations of the neighboring pixel areas. Through analysis of the topographical image data 304 input into the system, the wetness index calculator may determine the upslope contributing area by counting the adjacent pixel areas with elevations that would run water off to the given pixel area at lower elevation.

The wetness index calculator 320, having determined the upslope contributing area and having received the slope determinations made by the pixel/cell analyzer, may then determine the wetness index through application of the following formula:

$$(W_i) = \ln(\alpha/\tan(\beta))$$

where $W_i$ is the wetness index for a pixel area, $\alpha$ is the upslope contributing area per unit contour length of the pixel area, and $\beta$ is the local slope, as defined above.

The land area risk determiner and risk alleviator 322 makes determinations on which areas are at risk of accumulating an excessive amount of water, which possibly may inhibit crop growth and cause other problems. The cell risk determiner and risk alleviator may receive input information such as heat and temperature data 307, in order to make determinations regarding the amount of water evaporation that takes place in a low lying area. The land area risk determiner and risk alleviator 322 may make the risk determination based on the determined wetness indices. In one exemplary embodiment, ranges of wetness index values are selected for purposes of classifying areas of land into high risk, intermediate risk and low risk.

The land area risk determiner and risk alleviator 322 further initiates and controls a risk alleviating action for purposes of maintaining good growing conditions in that area at high risk of accumulating excess water, such as by eliminating excess water upon the land. For example, the system 300, e.g., the land area risk determiner and risk alleviator 322 may be in operative communication with a network of passages configured to remove water, such as system of drainage pipes located below the surface of the land that transports water away when an excess amount of water collects on and in the land. For example, the land area risk determiner and risk alleviator 322 may determine that, after precipitation has fallen or water has been distributed on the land by an irrigation system, excess water will flow to high risk areas, e.g., areas having high wetness indices. In response to this condition, the land area risk determiner and risk alleviator 322 may actuate, or direct the actuation, of the network of passages configured to remove water. Such a network may be a network of drainage pipes in which valves of the pipes are actuated to open holes on the pipes in order to collect the excess water in the pipes and transport same away to other places such as ponds, streams, etc. Through the operation of the pipes, the selective removal of water may be realized at a controlled removal rate, thereby maximizing the value of the land. Pumps, to facilitate the transport of water, may be installed in the system as well.

Figure 5:
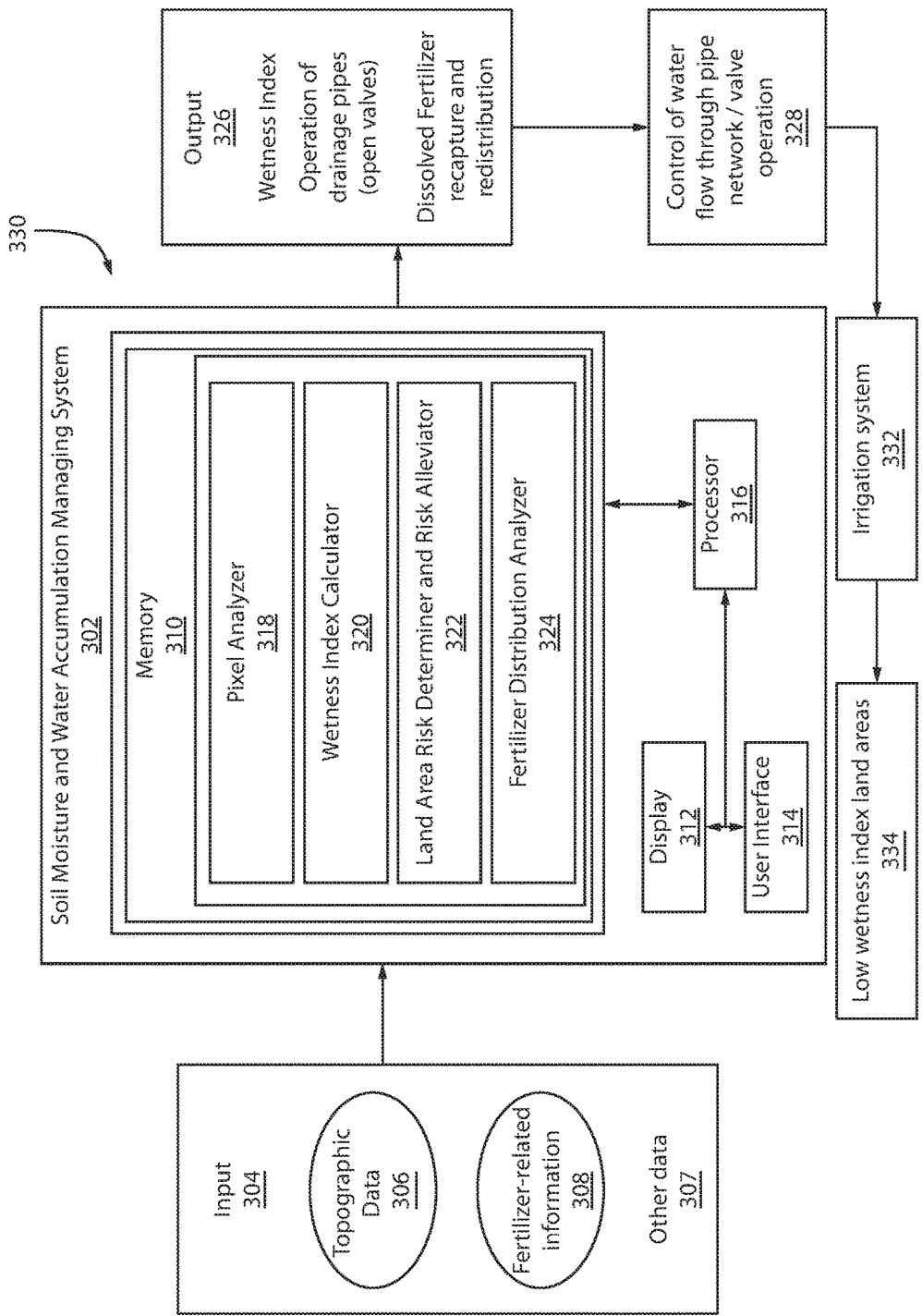
FIG. 5 depicts an exemplary embodiment of a system for controlling soil moisture, water accumulation and fertilizer distribution in accordance with an embodiment of the present principles.

FIG. 5 depicts a system 330 in accordance with an alternative embodiment of the present principles. System 330 includes many of the same components as system 300, which are identified by the same identifying terminology and part numbers, which components perform the same functions as described with regard to system 300. The description of those components is relied on herein. System 330 includes additional capabilities regarding the application and distribution of fertilizer on and in the land, and the redistribution of fertilizer due to the flow of water from higher elevation areas of land (e.g., low wetness index areas of land) to lower elevation areas of land (e.g., high wetness index areas of land).

In addition to receiving the input described above, system 300 additionally receives input 308 regarding the fertilizer that has been applied to the land. For example, the input may be the amounts of fertilizer applied to the land. This information may be input directly, e.g., a system operator may enter the data on the kind of fertilizer, the manner in which it was distributed, and the amount applied, e.g., the amount applied per unit of area, the areas to which fertilizer is applied, and if there are variances in the application, then the amounts applied to each specific area. In another embodiment, the amount of fertilizer is determined indirectly, e.g., through nitrogen sensors that are installed in the land. The information on nitrogen concentrations can be transmitted and input into the system 330.

The fertilizer distribution analyzer 324 receives the wetness index determinations made for the discreet land areas by the wetness index calculator. The fertilizer distribution analyzer determines the amount of fertilizer in the soil within a given area through calculating a dissolution rate of the fertilizer and the flow of water from low wetness index areas of land to high wetness index areas of land. For example, the fertilizer distribution analyzer 324 receives information concerning the amount of water in a cell (received, e.g., from moisture sensors 307 installed in the land), and may receive information about the soil and its water conductivity properties, receives the wetness index of the cell, and receives data for the fertilizer, e.g., the amount of fertilizer that dissolves in a unit of water, e.g., weight/volume, and the time it takes for the dissolving to take place, e.g., weight/volume per unit of time. From this information, the fertilizer distribution analyzer 324 determines an estimate of the amount of fertilizer that dissolves in water and is transferred by water flowing from a relatively low wetness index region (e.g., a high elevation cell where there is runoff) to a relatively high wet wetness index region (e.g., a low elevation cell where the water collects). Upon the transfer of water in which fertilizer is dissolved, fertilizer distribution analyzer 324 may determine the amounts of fertilizer remaining in the areas of land of high wetness indices and the areas of land of low wetness indices.

As indicated above, with regard to system 300, land area risk determiner and risk alleviator 322 may control and manage an underground water removal system that may be a series of interconnected pipes that have been installed in the land. The fertilizer distribution analyzer 324 may instruct the land area risk determiner and risk alleviator 322 to actuate a network of passages configured to remove water. Such a network may be an underground pipe network, in which the pipes of the network have electromechanically operated valves 328 e.g., solenoid valves, that are actuated in order to direct the pipes of high wetness index areas of land to transport the fertilizer-containing water to an irrigation system 332 where the fertilizer-containing water is combined with water being supplied to the irrigation system 332 and is then applied to the land, e.g., the land in areas of land of low wetness indices 334. Pumps, to facilitate the transport of water, may be installed in the system as well.

Further, the nitrogen content data collected by the nitrogen sensors can be analyzed to determine from which areas of land the run off originates by weighting the relative slopes and determining the probable flow of water from one cell to the other. From the data analysis, it may be determined that such areas of land, which may be lower wetness index regions, should receive added fertilizer.

Since the water that is removed from the plot still has fertilizer dissolved in it, the water can be redirected again and redistributed using, for example, a sprinkler system in an area where the fertilizer amounts are low. The time that irrigation takes place in those areas may be adjusted accordingly, such as for example, to increase the amounts of fertilizer deposited by water.

System 330 may be provided with a feedback loop that redirects the water that has been transported in the pipes to the low wetness index regions until the water being collected in the high wetness index regions has reduced fertilizer levels.

Figure 6:
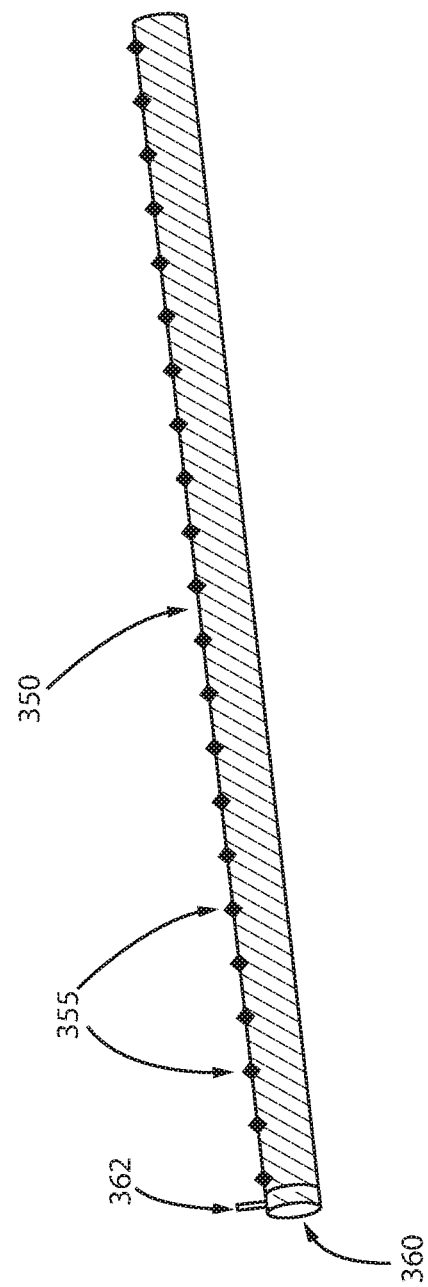
FIG. 6 depicts a segment of pipe including an operable valve that may be employed in embodiments in accordance with the present principles.

Referring to FIG. 6, shown is a pipe segment 355 operable in embodiments of the present principles. Pipe segment 350 is provided with holes or openings 355, two of which are exemplarily identified in the figure. Valve 360 is provided on the pipe segment to open and close the holes or openings 355 by communication 362 with a controller, e.g., the cell risk determiner and risk alleviator 322 of systems 300 and 330. The valves 360 may be electromechanically operated valves e.g., solenoid valves, under the control of system 330. It should be understood that a number of pipe segments 350 would be connected together to form a pipe network.

Figure 7:
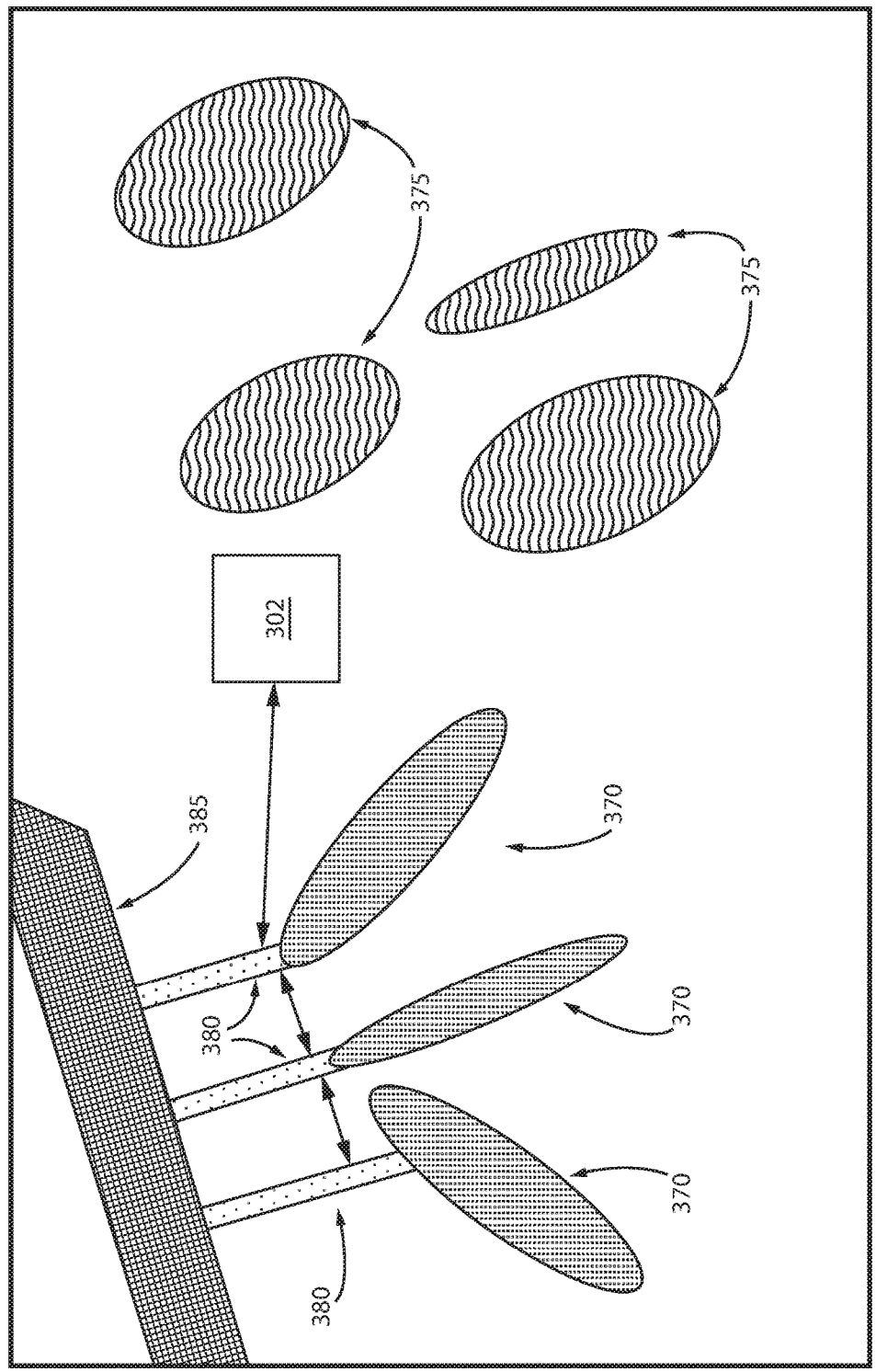
FIG. 7 depicts an aerial view of a plot of land having soil moisture and water accumulation control in accordance with an embodiment of the present principles.

FIG. 7 shows an exemplary example in the field of the control of soil moisture and water accumulation in accordance with an embodiment of the present principles. Depicted is an aerial view of a plot of land, e.g., farmland. High elevation, e.g., low wetness index areas of land are identified as 375. Low elevation, e.g., high wetness index areas of land are identified as 370. A network of passages configured to remove water, e.g., a network of pipes 380 extend from the high wetness index areas of land 370 to stream 385. The opening and closing of valves associated with the pipes may be controlled by system 302, as described above (valves are not shown). While the depiction of system 302 in the figure may appear to be local, it should be understood that this does not have to be the case. For example, the system 302 may be in a remote location or it may be in a cloud computing environment.

Figure 8:
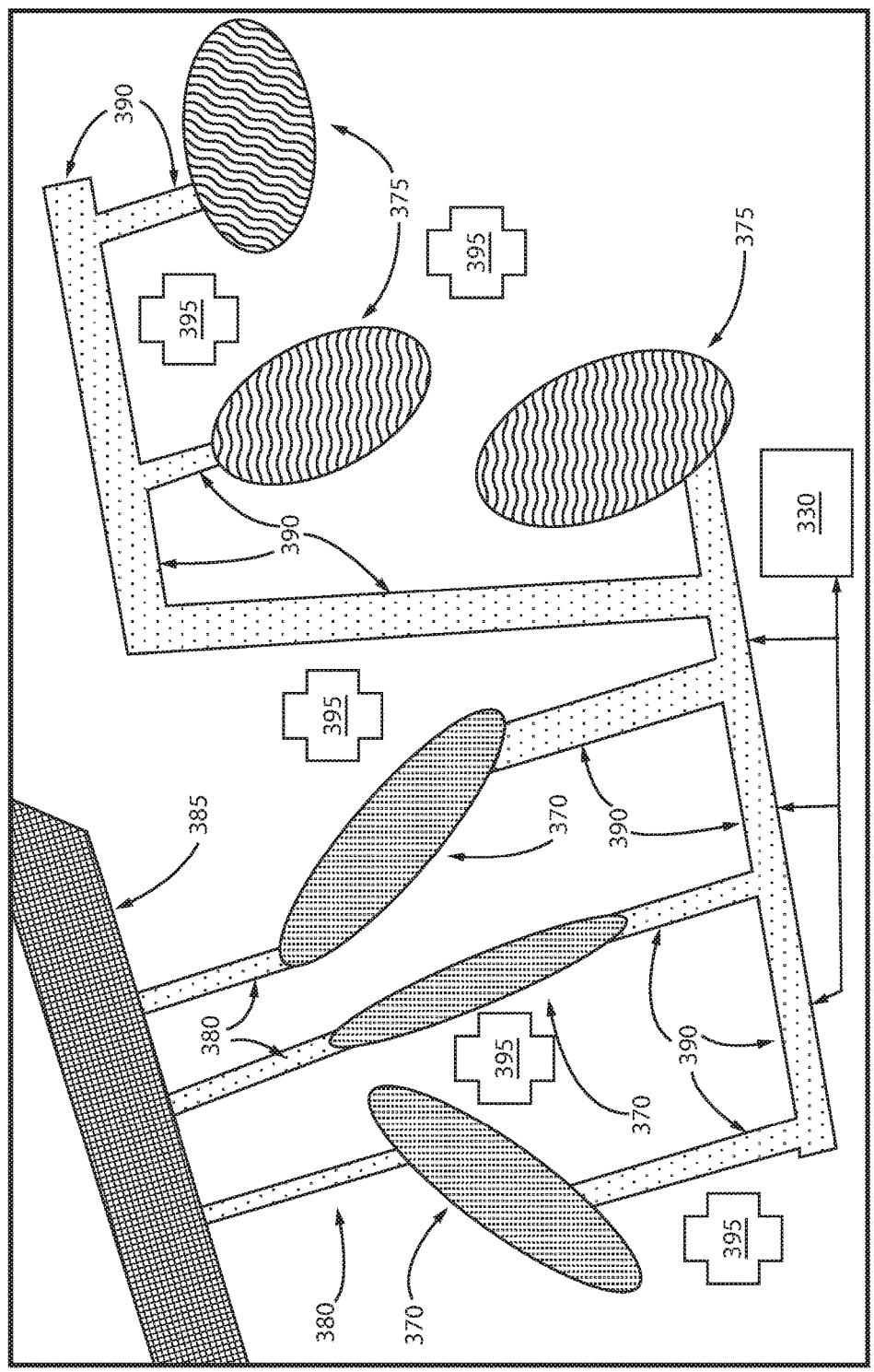
FIG. 8 depicts an aerial view of a plot of land having soil moisture, water accumulation, and fertilizer distribution control in accordance with an embodiment of the present principles.

FIG. 8 shows an exemplary example in the field of the control of fertilizer accumulation in accordance with an embodiment of the present principles. Depicted is an aerial view of a plot of land, e.g., farmland. Locations/components 370, 375, 380 and 385 are as identified in FIG. 7. As shown in FIG. 8, nitrogen sensors and moisture sensors 395 are located at various locations across the farm. As depicted, these sensors transmit and receive information wirelessly from the system 330. Determinations are made to assess the amounts of nitrogen in the soil due to water accumulation in low elevation, high wetness index areas of land 370 and the run off from high elevation, low wetness index areas of land 375. A network of passages configured to remove water, e.g., a pipe network 390, under the control of system 330, is provided to transfer fertilizer-containing water from the high wetness index areas of land 370 to the low wetness index areas of land 375. The opening and closing of valves associated with the pipes may be controlled by system 330, as described above (valves are not shown). While the depiction of system 330 in the figure may appear to be local, it should be understood that this does not have to be the case. For example, the system 330 may be in a remote location or it may be in a cloud computing environment.

Figure 9:
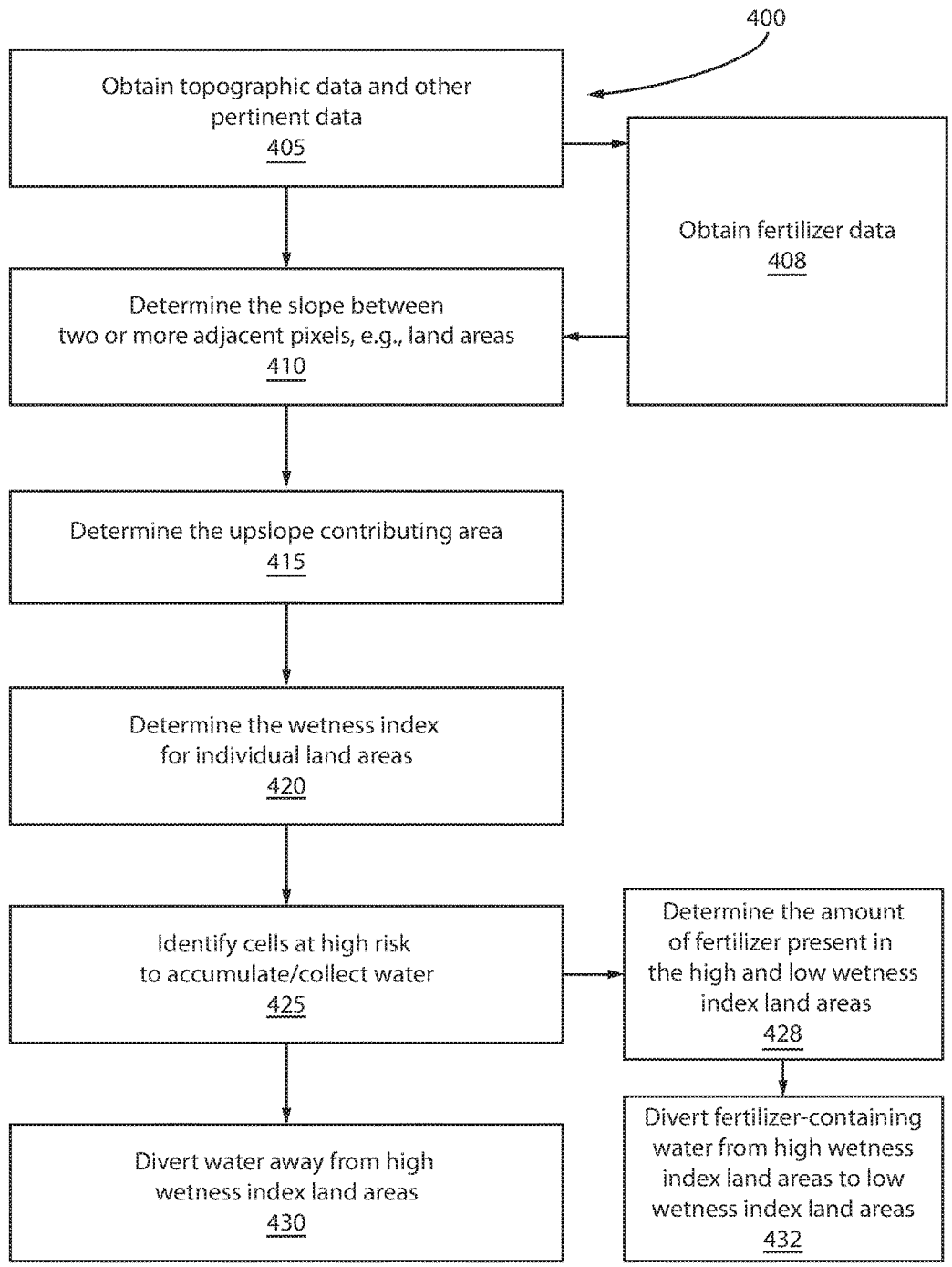
FIG. 9 depicts an exemplary embodiment of a method for controlling soil moisture, water accumulation, and fertilizer distribution in accordance with an embodiment of the present principles.

Referring to FIG. 9, an exemplary method 400 of controlling soil moisture and fertilizer content, in accordance with an embodiment of the present principles, is described. Part or all of method 400 may be performed by systems 300 and 330 of FIG. 4 and FIG. 5, respectively.

In block 405, information about a plot of land, e.g., a larger area of land such as a farm is obtained. The information may be topographic data. Other information that may be obtained include the amount of moisture in the soil, the heat and temperature of the soil, and heat and temperature of the ambient environment. Other information that may be obtained includes the amount of nitrogen in the soil. Such information may be indicative of the amount of fertilizer that has been applied to the land and which is present after effects such as water runoff from higher elevation areas of land and water collection in lower elevation areas of land have taken place.

In block 410, the slope of the land between two or more areas of land is determined, such as by extracting from the topographic data information concerning the elevations and locations of areas of land within the larger area of land. As indicated, topographic images such as those obtained from a Lidar system and the NED system includes information on elevations and locations on a pixel by pixel basis. In one embodiment, each pixel is representative of a cell, e.g., a discreet area of land, having a length dimension and a width dimension, in addition to a dimension corresponding to elevation. The slope of the land may be determined between adjacent areas of land. It may be determined among areas of land arranged in some other pattern, such as those arranged consecutively and linearly, to name but one example. The local slope β may be determined as follows:

$$\beta = \frac{dz}{dx} = [elev(pixel1) - elev(pixel2)]/\text{length}(pixel1) + \text{length}(pixel2)$$

Where elev(pixel1) and elev(pixel2) are the elevations of the land areas corresponding to the pixels 1 and 2 respectively (which in the present example, may be adjacent to each other). Length (pixel1) and length (pixel2) are the lengths of discreet land areas represented by the pixels 1 and 2 respectively, where pixels 1 and 2 are land area portions within a matrix of land portions. Elevation and length are expressed as a unit of length (e.g., meters, feet).

In block 415, the upslope contributing area is determined, as indicated above.

In block 420, the wetness index for individual areas of land is determined. The wetness index is determined as follows:

$$(W_i) = \ln(\alpha/\tan(\beta))$$

where $W_i$ is the wetness index for a land area portion, α is the upslope contributing area per unit contour length of the land area portion, and β is the slope, as defined above.

In block 425, areas of land at high risk to accumulate and/or collect excessive water are identified. This information may be obtained by classifying the areas of land in ranges of wetness indices, e.g., a high wetness index range and a low wetness index range. Other information may considered in ascertaining the risk, e.g., the heat or solar radiation accumulating in the cell, and information regarding the type of soil within the cell.

In block 430, action is taken to divert water away from high wetness index land areas, in order to reduce the risk associated with the accumulation and/or collection of excessive water in areas determined to have high wetness indices. In one exemplary embodiment, water may be transported away from the high wetness index areas of land by a network of passages configured to remove water, such as a network of underground pipes that may collect the excess water and transport it away from the high wetness index areas of land. The water may be transported to a water source location such as a stream, a lake, a pond, a river, and other kinds of water sources. In another embodiment, the water may be transported away in a trench or ditch that is formed in the surface of the land.

FIG. 9 further describes an exemplary method of controlling soil moisture and fertilizer content, in accordance with an embodiment of the present principles. Referring to block 408, among the data obtained is information concerning the amount of fertilizer applied to the land. This information may be obtained as described above. The actions taken in blocks 405, 410, 415, 420 and 425 are also performed, e.g., performed along with the action of block 408.

In block 428, the amount of fertilizer present in the areas of land of low wetness indices and the areas of land of high wetness indices is determined. This determination may be performed as described above.

In block 432, fertilizer-containing water from high wetness index land areas is diverted to low wetness index land areas. In this way, fertilizer that has accumulated and/or collected in areas of land determined to have high wetness indices (e.g., areas of land at high risk of water accumulation) may be redistributed to areas of land determined to have low wetness indices (e.g., areas of land at low risk of water accumulation). In one exemplary embodiment, water may be transported away from the high wetness index areas of land by a network of passages configured to remove water, such as a network of underground pipes that connect to an irrigation system to which the fertilizer-containing water is added and redistributed to areas of land of low wetness indices.

Controlling soil moisture, water accumulation, and fertilizer distribution in accordance with an embodiment of the present principles offers several advantages. For example, water accumulation, soil moisture levels, and fertilizer distribution across the land may be equalized, so that the crop yields for the entire farm may be maximized. All of land should be workable by heavy machinery, without being harmed, regardless of the wetness index of the cell, e.g., portion of land. Redistributing fertilizer should reduce the overall costs for this material.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
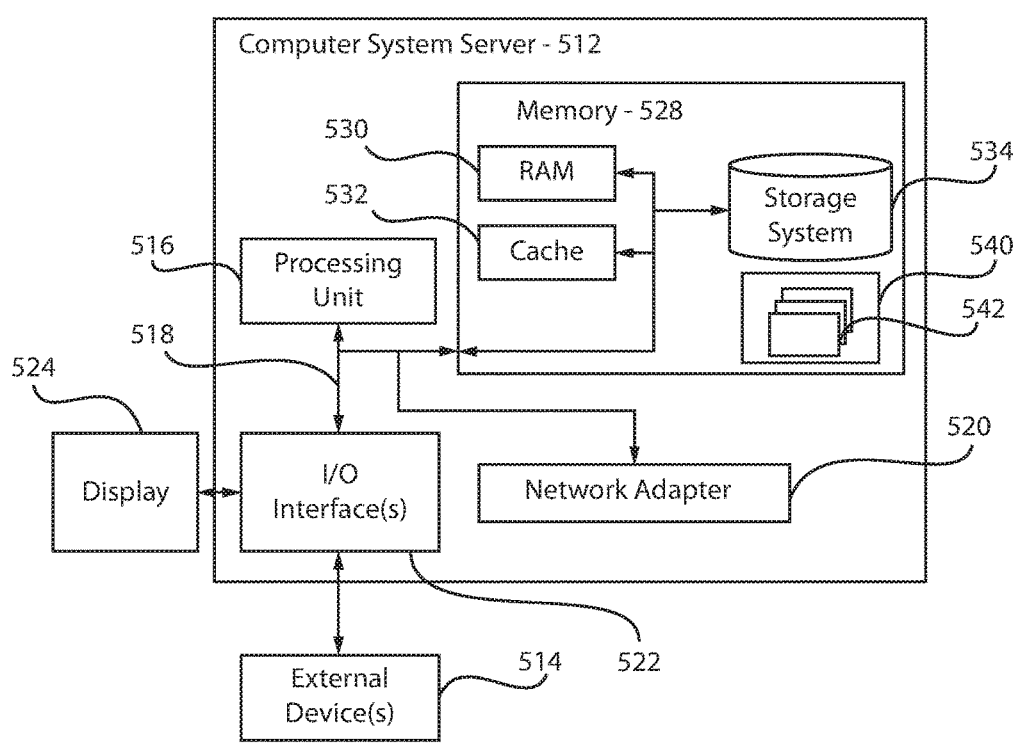
FIG. 10 shows an exemplary cloud computing node in accordance with an embodiment of the present principles.

Referring now to FIG. 10, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Figure 11:
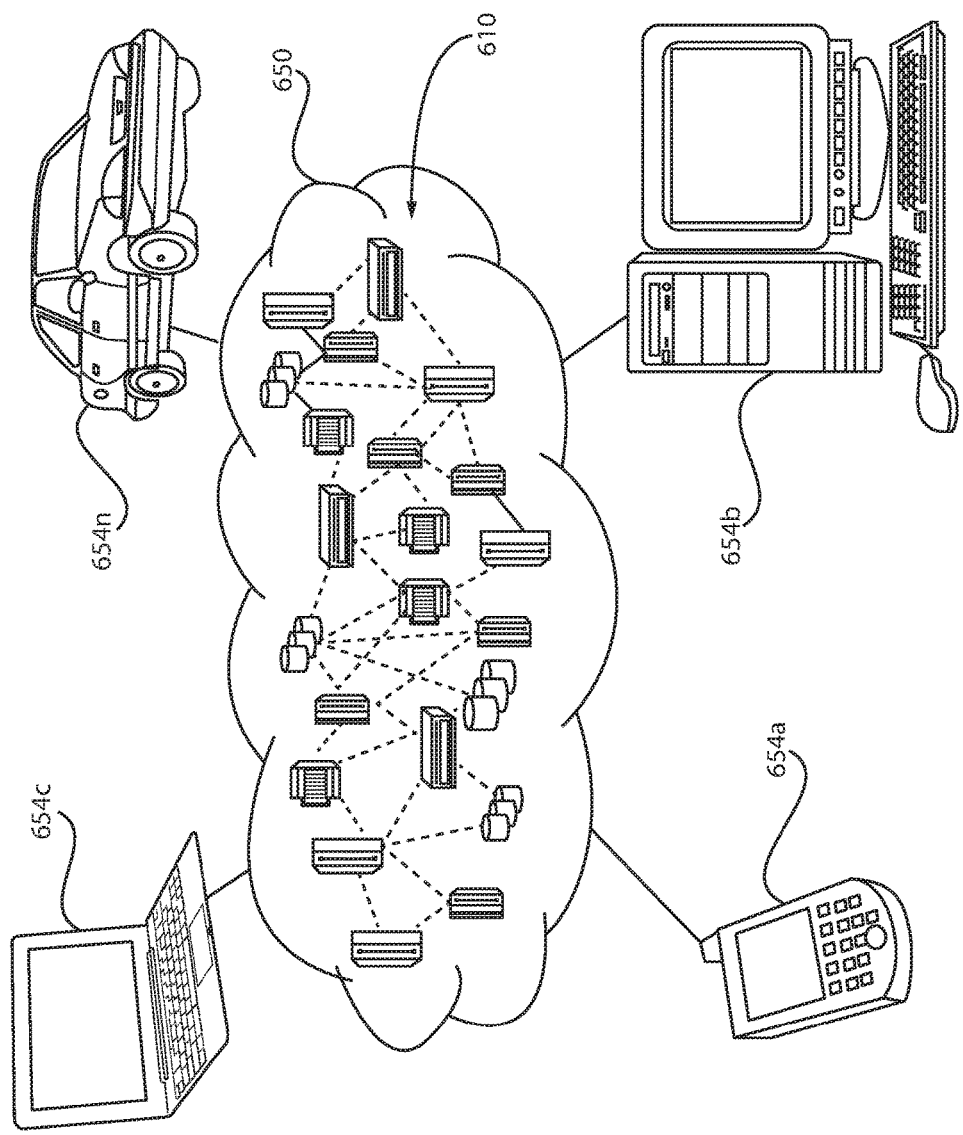
FIG. 11 shows an exemplary cloud computing environment in accordance with an embodiment of the present principles.

Referring now to FIG. 11, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 11 are intended to be illustrative only and that computing nodes 610 and cloud computing environment 650 can communicate with any type of computerized device over any type of network and/or network addressable connection (e.g., using a web browser).

Figure 12:
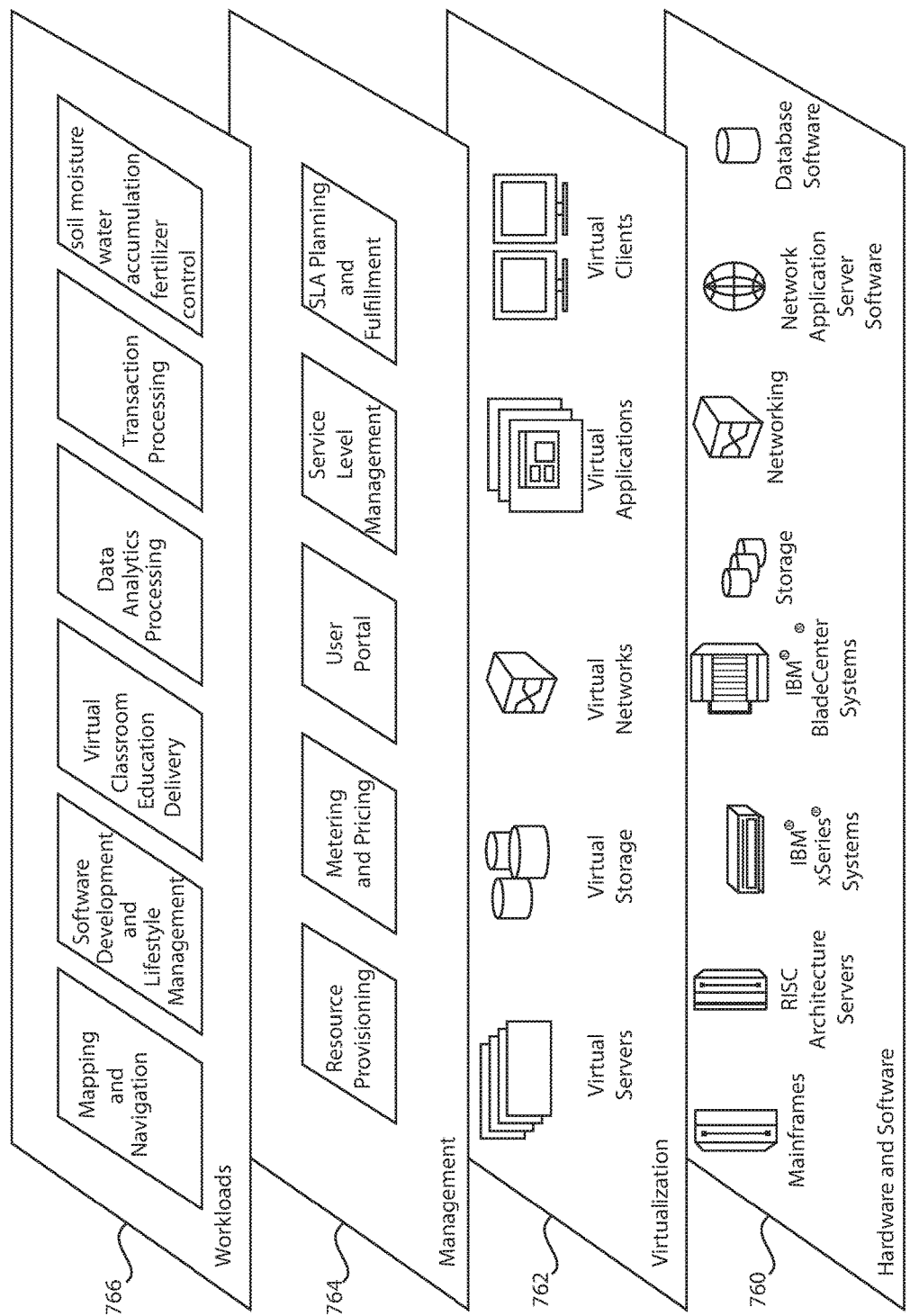
FIG. 12 shows exemplary abstraction model layers, in accordance with an embodiment of the present principles.

FIG. 12 shows a set of functional abstraction layers provided by cloud computing environment 650. It should be understood in advance that the components, layers, and functions shown in FIG. 12 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components.

Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and soil moisture, water accumulation, and fertilizer control.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method of controlling soil moisture, water accumulation and fertilizer distribution in land (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of controlling soil moisture and water accumulation in land, comprising:
    extracting elevation data and location data for defined areas of land within a larger area of land from two or more pixels of a topographic image that includes topographic data, with each pixel corresponding to a defined area of land;
    employing the elevation and location data in determining wetness indices for the defined areas of land based on a slope between two or more defined areas of land and an upslope contributing area per unit contour length for the defined areas of land;
    based on the determined wetness indices, identifying at risk defined areas of land that are at risk of accumulating water; and
    transporting water from the at risk defined areas of land to another location, wherein the determination of wetness indices is made in a hardware processor and the transporting of water reduces the risk of accumulating water in the at risk defined areas of land and improves crop growth potential in said areas.

2. The method of claim 1, further comprising obtaining the topographic image that includes topographic data from a database that stores topographic images.

3. The method of claim 1, wherein the wetness index ($W_i$) is determined by the formula:

$$\ln(\alpha/_{tan(\beta)})$$

wherein $\alpha$ is the upslope contributing area per unit contour length and $\beta$ is the slope between two or more defined areas of land.

4. The method of claim 3, further comprising obtaining the topographic image that includes topographic data from a database that stores topographic images.

5. The method of claim 1, wherein the transporting of water from the at risk defined areas of land to another location comprises transporting water in a network of passages configured to remove water that extends from the at risk defined areas of land to a water source location.

6. The method of claim 1, wherein the transporting water from the at risk defined areas of land to another location comprises transporting the water in a network of pipes that extends from the at risk defined areas of land to a water source location, the pipes being provided with valves operable between an open position allowing for the pipes to receive water and a closed position for retaining water in the at risk defined areas of land.

7. The method of claim 1, further comprising determining the amount of fertilizer dissolved in the water in the at risk defined areas of land; and
    transporting the water in a network of passages configured to remove water that extends from the at risk defined areas of land to areas of land that are determined, based on the determined wetness indices, to be at a low risk of accumulating water; and
    controlling the amount of water removed from the at risk defined areas of land dependent on water absorption characteristics of the soil and the rate of evaporation of water from surface of the at risk defined areas of land.

8. The method of claim 1, further comprising determining the amount of fertilizer dissolved in the water in the at risk defined areas of land; and
transporting the water in a network of pipes that that extends from the at risk defined areas of land to areas of land that are determined, based on the determined wetness indices, to be at a low risk of accumulating water, the pipes being provided with valves operable between an open position allowing for the pipes to receive water and a closed position for retaining water in the at risk defined areas of land.

9. The method of claim 1, further comprising determining the amount of fertilizer dissolved in the water in the at risk defined areas of land by one or more of determining the amount of fertilizer dissolved in the water based on the solubility characteristics of the fertilizer in the water and the amount of nitrogen present in the at risk defined areas of land.

10. A system for controlling soil moisture and water accumulation in land, comprising:
one or more processors including memory;
one or more inputs through which topographic data for land is received by the system;
an analyzer that analyzes the topographic data to determine elevations and locations of defined areas of the land;
a wetness index calculator that determines wetness indices for the defined areas of the land;
a risk determiner and risk alleviator that, based on the determined wetness indices, identifies at risk defined areas of land that are at risk of accumulating water and controls the transporting of water away from the at risk defined areas of land; and
a network of passages configured to transport water away from the at risk defined areas of land.

11. The system of claim 10, wherein the analyzer is configured to analyze pixels of images comprising the topographic data to determine the elevations and locations of the defined areas of the land, wherein each pixel corresponds to a defined area of the land.

12. The system of claim 10, wherein the wetness index calculator determines the slope between two or more defined areas of land, the upslope contributing area per unit contour length of the defined areas of land, and the wetness indices of the defined areas of the land based on the determined values for slope and upslope contributing area.

13. The system of claim 10, wherein the risk determiner and risk alleviator is configured to control the transportation of water away from the at risk defined areas of land through an underground network of pipes that extends from the at risk defined areas of land to a water source location, the pipes being provided with valves operable by the risk determiner and risk alleviator between an open position allowing for the pipes to receive water and a closed position for retaining water in the at risk defined areas of land.

14. The system of claim 10, further comprising a fertilizer distribution analyzer that determines the amount of fertilizer dissolved in the water in at risk defined areas of land by one or more of determining the amount of fertilizer dissolved in the water based on the solubility characteristics of the fertilizer in water and the amount of nitrogen present in the at risk defined areas of land.

15. The system of claim 10, further comprising a fertilizer distribution analyzer configured to determine the distribution of fertilizer in the at risk defined areas of land and wherein the risk determiner and risk alleviator controls the redistribution of fertilizer-containing water from the at risk defined areas of land to areas of land that are determined, based on the determined wetness indices, to be at a low risk of accumulating water through the network of passages configured to transport water away from the at risk defined areas of land.

16. The system of claim 10, further comprising a fertilizer distribution analyzer configured to determine the distribution of fertilizer in the at risk defined areas of land and wherein the risk determiner and risk alleviator controls the redistribution of fertilizer-containing water from the at risk defined areas of land to areas of land that are determined, based on the determined wetness indices, to be at a low risk of accumulating water through the network of passages comprising pipes being provided with valves operable by the risk determiner and risk alleviator between an open position allowing for the pipes to receive water and a closed position for retaining water in the at risk defined areas of land.

17. The system of claim 10, wherein the one or more inputs comprise sensors in operative communication that measure one or more of the moisture in the land and the nitrogen content of the land.

18. A computer program product for controlling soil moisture and water accumulation in land, the computer program product comprising a non-transitory computer readable storage medium having program instructions embodied therewith, the program instructions being executable by a computer to cause the computer to perform a method comprising:
extracting elevation data and location data for defined areas of land within a larger area of land from two or more pixels of a topographic image that includes topographic data, with each pixel corresponding to a defined area of land;
employing the elevation and location data in determining wetness indices for the defined areas of land based on a slope between two or more defined areas of land and an upslope contributing area per unit contour length for the defined areas of land;
based on the determined wetness indices, identifying at risk defined areas of land that are at risk of accumulating water; and
transporting water from the at risk defined areas of land to another location, wherein the transporting of water reduces the risk of accumulating water in the at risk defined areas of land and improves crop growth potential in said areas.

19. The computer program product of claim 18, wherein the program instructions executable by a computer cause the computer to perform the method of further determining the amount of fertilizer dissolved in the water in at risk defined areas of land by one or more of determining the amount of fertilizer dissolved in the water and the amount of nitrogen present in the at risk defined areas of land.

20. The computer program product of claim 18, wherein the program instructions executable by a computer cause the computer to perform the method further comprising determining the amount of fertilizer dissolved in the at risk defined areas of land; and
transporting the water in an underground network of pipes that that extends from the at risk defined areas of land to areas of land that are determined, based on the determined wetness indices, to be at a low risk of accumulating water, the pipes being provided with valves operable between an open position allowing for the pipes to receive water and a closed position for retaining water in the at risk defined areas of land.

* * * * *